United States Patent [19]

Hacker et al.

[11] Patent Number: 5,131,625
[45] Date of Patent: Jul. 21, 1992

[54] ONE-TIME USE DISPOSABLE BOTTLE VALVE

[75] Inventors: Thomas G. Hacker, Anaheim; Thomas P. Maxwell, Santa Ana, both of Calif.

[73] Assignee: Minnesota Mining and Manufacturing Company, St. Paul, Minn.

[21] Appl. No.: 757,455

[22] Filed: Sep. 10, 1991

[51] Int. Cl.$^5$ ............................................. F16L 37/28
[52] U.S. Cl. ................................. 251/149.6; 141/383; 222/147; 137/315
[58] Field of Search ............... 137/315; 141/383, 384; 251/149.6; 222/147

[56] References Cited

U.S. PATENT DOCUMENTS

| | | | |
|---|---|---|---|
| 2,747,775 | 5/1956 | Pritchard | 141/383 |
| 3,704,813 | 12/1972 | Devol | 137/315 |
| 4,137,930 | 2/1979 | Scholle | 137/614.03 |
| 4,137,955 | 2/1979 | Carlson | 141/349 |
| 4,290,276 | 9/1981 | Knowles | 137/68.1 |
| 4,386,622 | 6/1983 | Munsch | 137/1 |
| 4,543,980 | 10/1985 | Van Der Sanden | 222/147 |
| 4,573,611 | 3/1986 | O'Connor | 222/147 |
| 4,619,284 | 10/1986 | Delarue et al. | 137/68.1 |
| 4,660,744 | 4/1987 | Csaszar | 222/147 |
| 4,724,857 | 2/1988 | Taylor | 137/67 |
| 4,821,775 | 4/1989 | Cooksey | 137/68.2 |

Primary Examiner—A. Michael Chambers
Attorney, Agent, or Firm—Gary L. Griswold; Walter N. Kirn; Dale E. Hulse

[57] ABSTRACT

An apparatus for holding a fluid under pressure, including a container for containing the fluid under pressure and a valve mounted on the container. The container has a passage leading to the exterior of the container, and the valve has an actuator for moving the valve between closed and open positions. A locking device is responsive to movement of the actuator to a position in which the valve is open to lock the actuator against movement that would close the valve. Consequently, the valve is locked in the open position.

14 Claims, 3 Drawing Sheets

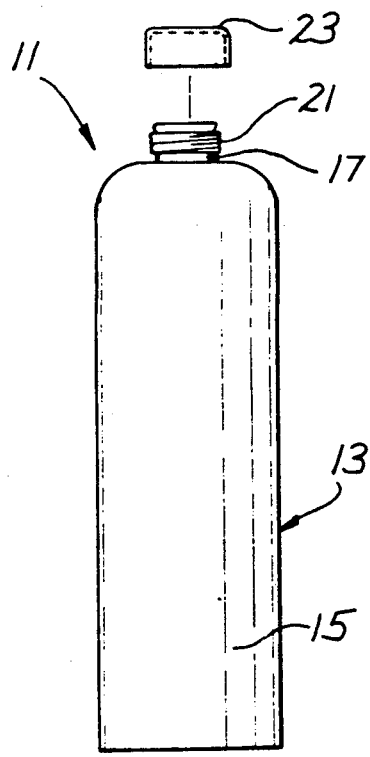
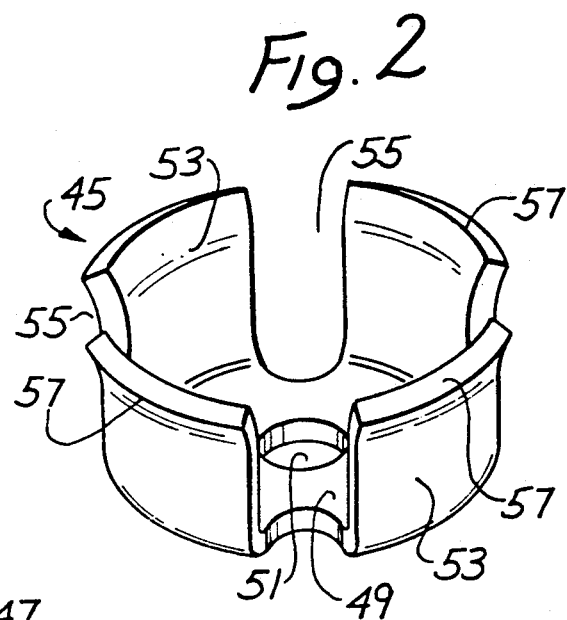
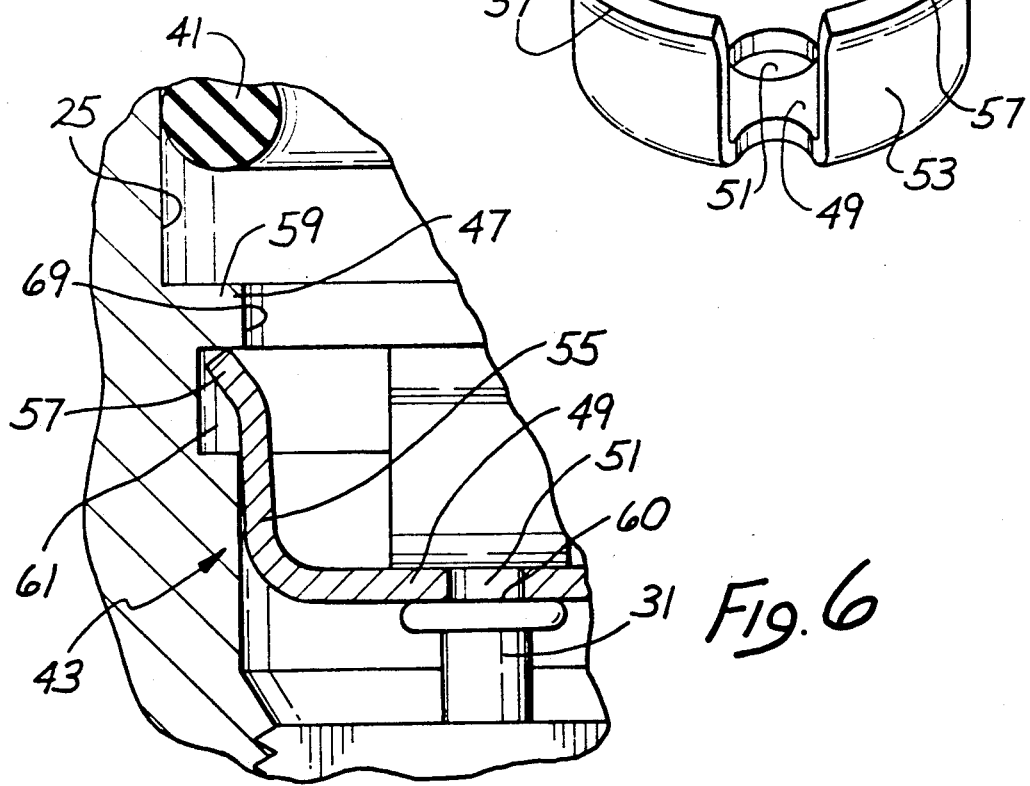

ONE-TIME USE DISPOSABLE BOTTLE VALVE

BACKGROUND OF THE INVENTION

It is sometimes necessary to provide a container for holding a fluid under pressure and to assure that the container cannot be reused for holding a fluid under pressure. One example is the bottle or container commonly used to hold a calibration gas, such as a gas comprising oxygen, carbon dioxide and nitrogen, for use in calibrating an apparatus which monitors the partial pressures of blood gases. In this case, the gas is furnished under pressure in a closed container to the user. The container has a valve which can be opened by depressing of an actuator to allow the gas under pressure to be released to the instrument to be calibrated.

The valve employed with the container is commonly referred to as a Schrader Valve, and this valve operates much in the same manner as a conventional passenger tire valve in that depression of an actuator allows the gases from within the container to be released through the valve. A valve of this type allows the container to be refilled by simply depressing of the actuator to open the valve much in the same manner that a passenger car tire can be reinflated. However, this is not acceptable at least in some countries whose laws forbid reusing of containers of this type for calibration gases at pressures greater than a predetermined level.

One way to prevent the reuse of a container of this type is to employ a valve with a frangible element which is capable of only a single use. However, this would require a complete redesign of the container described above with consequent cost and other possible undesirable departures from a construction found to be most satisfactory.

SUMMARY OF THE INVENTION

This invention provides a simple and inexpensive way to lock the conventional valve described above in the open position in response to opening of the valve. This locking device can be incorporated into the standard valve-container apparatus described above thereby retaining all of its desirable features.

This invention can be embodied in an apparatus for holding a fluid under pressure which comprises a container for containing the fluid under pressure with the container having a passage leading to the exterior of the container. A valve is mounted on the container and has a closed position in which the valve closes the passage and an open position in which the valve opens the passage. The valve includes an actuator which is repeatedly movable between first and second positions for repeatedly moving the valve between the closed and open positions, respectively.

With this invention, a locking device is responsive to movement of the actuator to the second position to lock the actuator in the second position. This prevents the repeated movement of the actuator between the first and second positions and also locks the valve in the open position. Consequently, the standard container for pressurized gases can be held open following an initial use to prevent refilling of the container with any fluid under pressure.

Although various arrangements are possible, in the standard container for gases, the actuator is in registry with the passage in the container, and the actuator is movable generally toward the interior of the container in moving from the first position toward the second position. A preferred container includes a receptacle having an opening and a fitting mounted in the opening. The fitting has a passage extending through it which leads from the interior to the exterior of the container. The valve is mounted on the fitting in the passage of the fitting.

The locking device may be considered as including a locking section and a locking member lockingly engageable with the locking section. One of the locking section and the locking member is on the fitting, and the other of the locking section and the locking member is movable with the actuator. Preferably, the locking section is on the fitting, and the locking member is movable with the actuator.

Although the locking member may be of various different constructions, it is preferably generally cup-shaped and opens outwardly of the container so it can receive an external member, such as a regulator stem, for depressing the actuator, i.e., moving it to open the valve. The locking member preferably includes an end wall engageable with the actuator and a plurality of spring fingers coupled to the end wall.

Although the locking section of the fitting may be of different constructions, in a preferred form it includes a shoulder in the passage lockingly engageable by the locking member. The shoulder can be easily defined by a groove in the passage of the fitting.

Although the invention is useful in other contexts and constructions, it should be noted that the only additional part needed to adapt the standard pressurized container and valve apparatus is the locking member. The only modification of the components of the standard container and valve apparatus is the formation of the shoulder on the fitting for cooperation with the locking member.

The invention, together with additional features and advantages thereof may best be understood by reference to the following description taken in connection with the accompanying illustrative drawing.

BRIEF DESCRIPTION OF THE DRAWINGS

FIG. 1 is an elevational view of an apparatus constructed in accordance with the teachings of this invention with the dust cover of the container removed.

FIG. 2 is a perspective view of one preferred form of locking member.

FIG. 3 is an enlarged, fragmentary, axial sectional view through the region of the container which includes the fitting and the valve with the valve in the closed position and the regulator stem about to be inserted into the fitting. A blood gas instrument shown schematically.

DESCRIPTION OF THE PREFERRED EMBODIMENT

Figure 4:
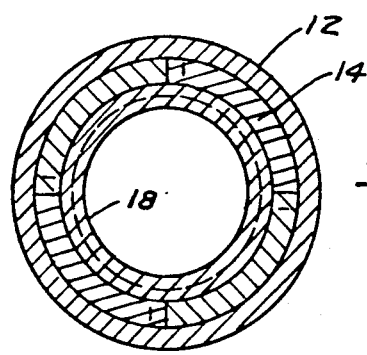
FIG. 4 is a view similar to FIG. 3 with the regulator stem inserted into the fitting and holding the valve in the open position.
Figure 5:
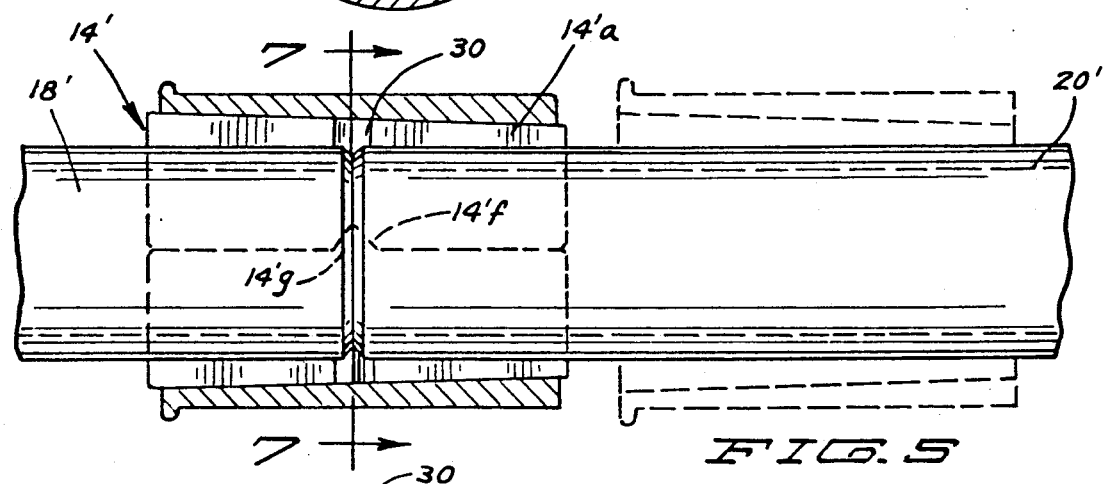
FIG. 5 is a view similar to FIG. 3 with the regulator stem withdrawn and with the locking member engaging the shoulder of the fitting to hold the valve in the open position.

FIG. 1 shows an apparatus 11 for holding a fluid, and in this case, a calibration gas comprising oxygen, carbon dioxide and nitrogen under a pressure of over 12 bar and specifically at 30 bar pressure. The apparatus 11 includes a container 13 which in turn comprises a receptacle 15 in the form of a bottle and a fitting 17 (FIGS. 3-5). The receptacle 15, which may be constructed for example of steel or aluminum, has an opening 19, and the fitting 17 is fixedly mounted in the opening in a conventional manner as by brazing or welding.

The fitting 17 has external threads 21 for releasably attaching the container 13 to an instrument 65 which is referred to hereinbelow. A dust cover 23 can be retained on the threads 21 by an interference fit. The fitting 17 has a passage 25 extending axially through the fitting from the interior 27 of the receptacle to the exterior of the receptacle. The fitting 17 may be constructed of any suitable material, such as steel or aluminum.

A valve 29 is mounted on the fitting 17 in the passage 25 as by threads 30 on the valve and the fitting 17. The valve 29 includes an actuator 31 which is movable between an extended or first position shown in FIG. 3 and a second or depressed condition shown in FIGS. 4 and 5. In the extended position of FIG. 3, the valve 29 is in a closed position in which the passage 25 is closed by the valve. In the depressed or second condition of FIGS. 4 and 5, the valve is in an open position in which the passageway can provide communication between the interior 27 of the receptacle 15 and the exterior of the receptacle. For this purpose, the valve 29 includes a valve seat 33 and a valve member 35 (FIGS. 3-5) coupled to the actuator 31. In FIG. 3, the valve member 35 engages the valve seat 33 to close the valve, and in FIGS. 4 and 5, the valve member 35 is spaced axially from the valve seat 33 to open the valve. In the open position, a passage 37 (FIG. 4) through the valve is open to allow the escape of gas under pressure from the interior 27 to the exterior of the receptacle.

The valve 29 is a conventional valve known as a Schrader valve, and as such, is not shown in greater detail herein. The valve 29 functions much like the conventional passenger tire valve in that it is normally spring-biased to a closed position (FIG. 3) by a coil compression spring 38 which acts between a shoulder 40 of the valve housing and a collar 42 on the actuator 31. The valve 29 can be opened by depressing of the actuator 31 to compress the spring. However, upon release of the actuator 31, the spring 38 automatically returns the valve to the closed position of FIG. 3. Thus, the actuator is repeatedly movable between the extended and depressed positions to repeatedly open and close the valve.

The apparatus 11 also includes a bushing 39 which may be constructed of any suitable bushing material, either polymeric or metallic, and an elastomeric O-ring seal 41. The bushing 39 is suitably affixed within the passage 25 as by a press fit, and the O-ring 41 is immediately axially inwardly of the bushing.

As described thus far in the "Description of the Preferred Embodiment", the apparatus 11 is conventional. The improvement provided by this invention includes a locking device 43 (FIGS. 3-6) which is responsive to movement of the actuator 31 to the second or depressed position to lock the actuator in that position to prevent repeated movement of the actuator between the extended and retracted positions and to lock the valve 29 in the open position of FIGS. 4 and 5. Although the locking device 43 can be of various different constructions, in this embodiment, it includes a locking member 45 movable with the actuator 31 and lockingly engageable with a locking section 47 of the fitting 17 in the second or depressed position of the actuator to lock the valve 29 in the open position of FIGS. 4 and 5.

As best shown in FIG. 2, the locking member 45 is preferably, but not necessarily, in the form of a spring clip and is generally cup-shaped, and as shown in FIGS. 3-5, opens outwardly of the container 13. The locking member 45 includes an end wall 49 having a central opening 51 and a plurality of resilient spring fingers 53 coupled to the end wall. The spring fingers 53 are equally spaced circumferentially by slots 55, and each of the spring fingers 53 constitutes a resilient projection. The locking member 45 may be integrally constructed from a resilient metal, such as spring steel, and each of the resilient fingers 53 has a terminal portion 57 which is flared radially outwardly.

Figure 6:
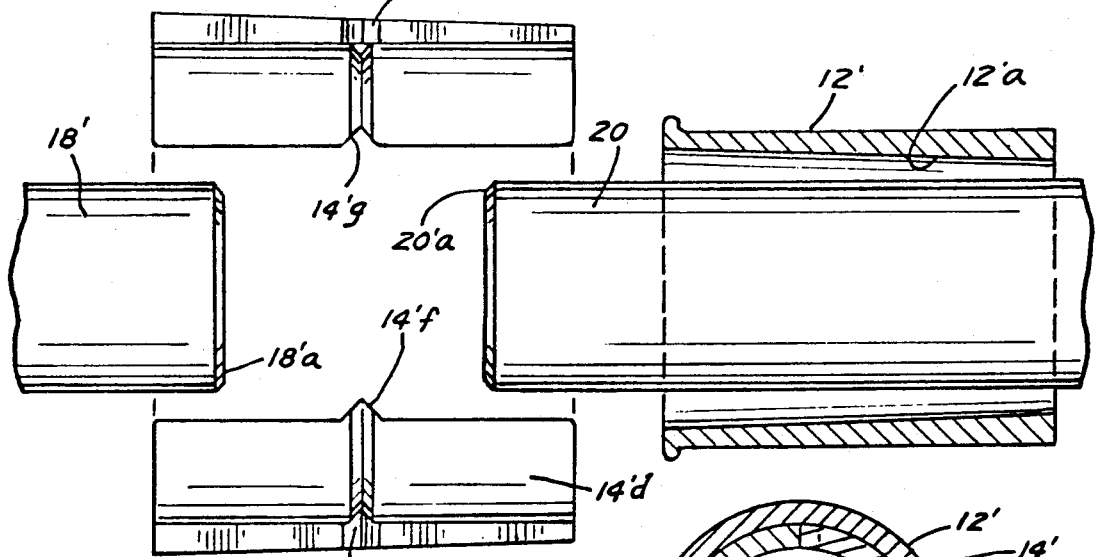
FIG. 6 is an enlarged, fragmentary view of a portion of FIG. 5 showing how the locking member cooperates with the shoulder to lock the valve in the open position.
Figure 7:
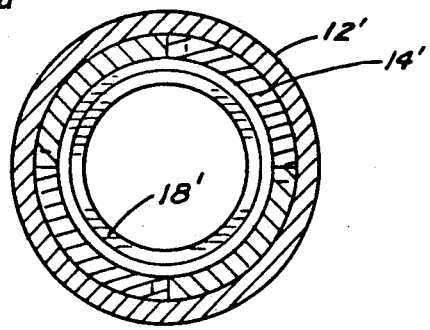
Figure 5:
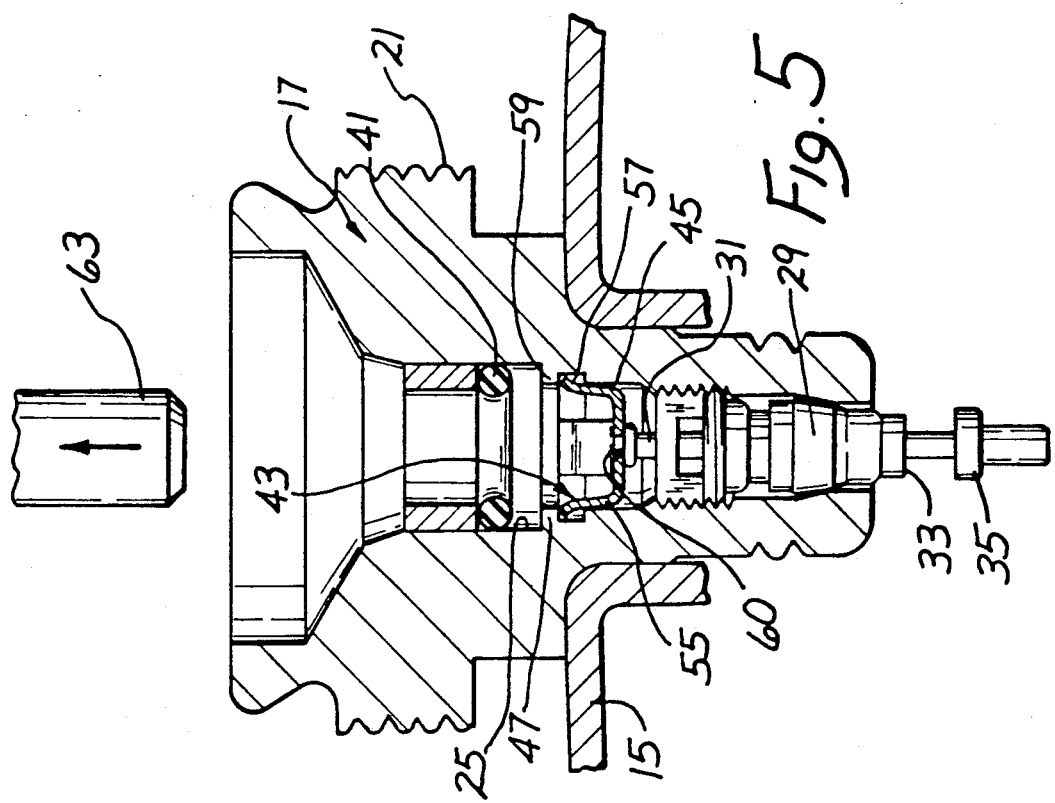
Figure 4:
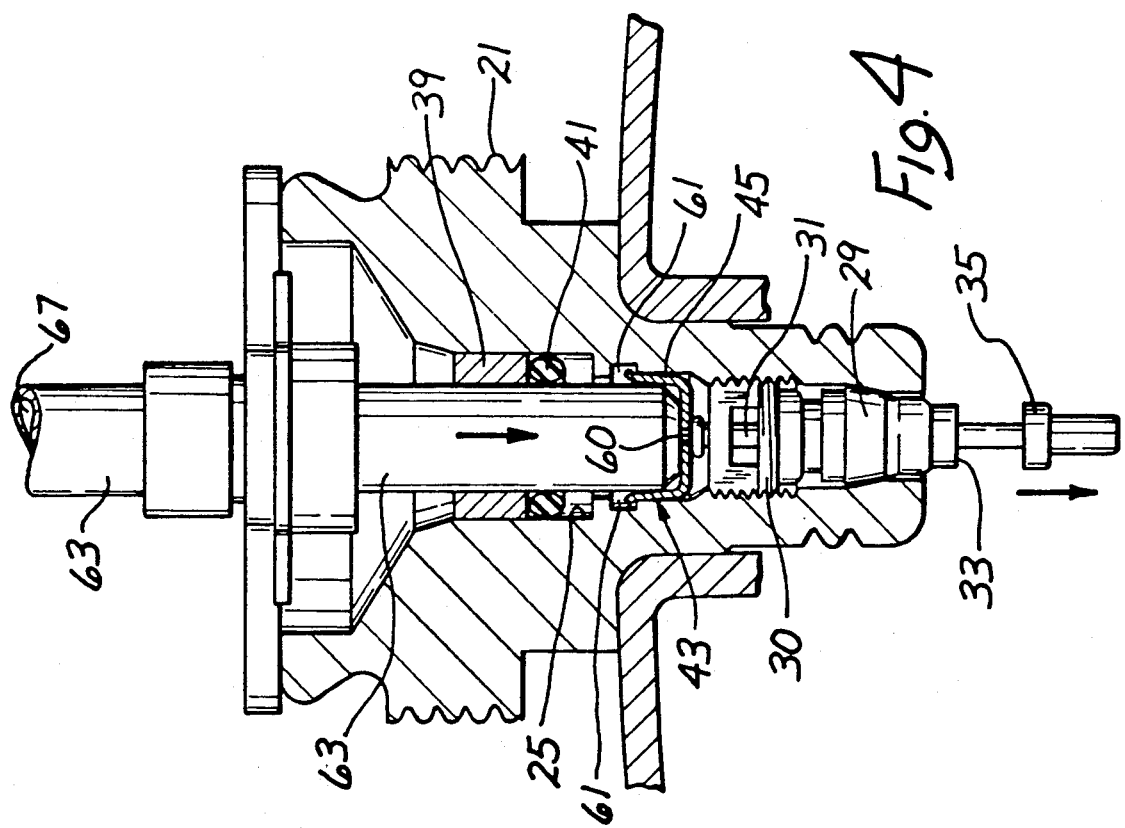

The locking section 47 may also be of various different constructions. However, in this embodiment, it includes an annular shoulder 59 in the passage 25 which is defined by an annular groove 61 as best shown in FIG. 6.

As shown in FIGS. 3-6, the locking device is positioned with the end wall 49 contacting an outer end 60 of the actuator 31. In the open position of FIG. 3, the locking member 45 is held between the outer end 60 of the actuator 31 and the seal 41. When so positioned, the locking member 45 is adapted to receive a regulator stem 63 of a conventional blood gas instrument 65. The stem 63 has an axial passage 67 extending through it.

The O-ring seal 41 is free to float in the passage 25 between the bushing 39 and the locking member 45. With the valve 29 in the closed position of FIG. 3, the O-ring seal is retained between the bushing 39 and the locking member 45. The locking member 45 is held in position by the actuator 31, which is urged to the position of FIG. 3 by the spring 38 of the valve 29. Thus, the O-ring seal 41 also serves to hold or retain the locking member 45 on the outer end 60 of the actuator 31.

In use of the apparatus 11, the threads 21 of the container 13 are screwed into the instrument 65 so that the container is moved over the stem 63 to insert the stem into the passage 25 of the fitting 17 and specifically through the bushing 39 and the seal 41 and into the cup-shaped locking member 45 as shown in FIG. 4. The bushing 39 guides the stem 63. By advancing the stem 63 farther into the passage 25, the stem forces the locking member 45 and the actuator 31 inwardly to move the actuator to the depressed position and thereby moves the valve member 35 off of the valve seat 33 to open the valve 29 (FIG. 4). Assuming that the container 13 has been previously charged with an appropriate calibration gas under pressure, this releases the gas to flow into the instrument 65 via the passage 37 and the valve 29, the opening 51 in the end wall 49 of the locking member 45 and the passage 67 in the stem 63. The seal 41 prevents the gas under pressure from escaping to the exterior of the container through the interface between the bushing 39 and the stem 63.

After the calibration gas has flowed from the container 13 into the instrument 65, the stem 63 and the fitting 17 are decoupled as shown in FIG. 5. When the container 13 is pulled off of the stem 63, the spring 38 in the valve 29 urges the actuator 31 outwardly of the receptacle 15 and thereby pushes the locking member 45 outwardly until the locking member engages the shoulder 59 as shown in FIGS. 5 and 6. Further movement of the valve member 35 toward the valve seat 33 is prevented by the engagement of the locking member 45 and the shoulder 59, and the valve 29, which is designed for repeated opening and closing use, is now locked permanently in the open position. As seen in the drawings, the locking member 45 is configured so as to allow for continuous fluid communication between the container 13 and the exterior of the container after the actuator 31 has been moved to the second or open position; this of course would remain true even upon an attempt to refill the container 13. Consequently, the container 13 cannot be refilled with a gas under pressure without defeating the locking device 43.

More specifically, as the locking member 45 is urged inwardly in the passage 25 from the position of FIG. 3 toward the position of FIG. 4, the resilient fingers 53 are urged resiliently radially inwardly by virtue of contact of the terminal portions 57 with an inner surface 69 (FIG. 6) of the shoulder 59. As the axial inward movement of the locking member 45 in the passage 25 continues, eventually the terminal portions 57 of the fingers 53 snap radially outwardly into the groove 61 as shown in FIG. 4. The axial length of the groove 61 is selected so that the terminal portions 57 are in the groove 61 when the valve is in the open position of FIG. 4, and the actuator 31 has been moved to the inwardmost or most depressed position. Finally, when the stem 63 is removed and the locking member 45 is moved outwardly in the passage 25, it is the terminal portions 57 of the fingers 53 which ultimately engage the shoulder 59 as shown in FIGS. 5 and 6.

Accordingly, the valve 29 is held in the open position to prevent refilling of the receptacle 15 with a pressurized gas by a very simple and inexpensive construction. In the specific embodiment illustrated, it is only necessary to add the locking member 45 and to modify the conventional fitting 17 by providing the internal groove 61 in order to convert a standard pressurized container apparatus which could be refilled with pressurized gas into the apparatus 11 which cannot be refilled with a pressurized fluid.

Although an exemplary embodiment of the invention has been shown and described, many changes, modifications and substitutions may be made by one having ordinary skill in the art without necessarily departing from the spirit and scope of this invention.

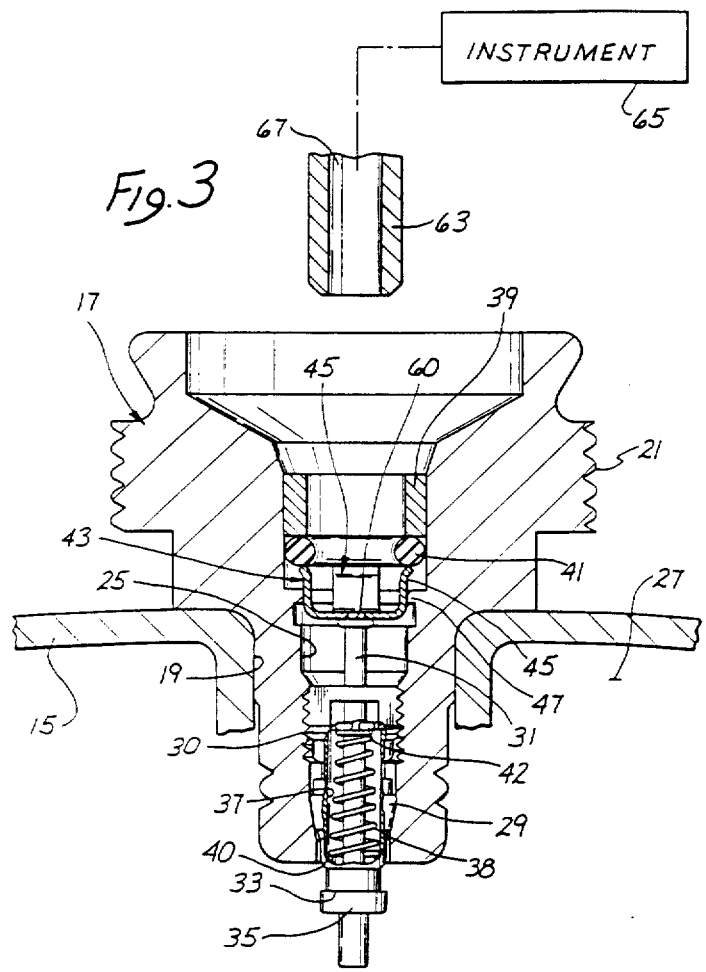

We claim:

1. An apparatus for holding a fluid under pressure comprising:
   a container for containing a fluid under pressure, said container having a passage leading to the exterior of the container;
   a valve mounted on the container and having a closed position in which the valve closes the passage and an open position in which the valve opens the passage;
   said valve including an actuator repeatedly movable between first and second positions for repeatedly moving the valve between said closed and open positions, respectively; and
   a locking device responsive to movement of the actuator to the second position to lock the actuator in the second position to prevent such repeated movement of the actuator between the first and second positions and to lock the valve in the open position, said locking device being configured so as to allow for continuous fluid communication between the container and the exterior after the actuator has been moved to the second position, even upon an attempt to refill the container.

2. An apparatus as defined in claim 1 wherein the actuator is in registry with said passage in the container and the actuator is movable generally toward the interior of the container in moving from the first position toward the second position.

3. An apparatus as defined in claim 2 wherein the locking device includes a spring clip movable with the actuator for use in locking the actuator in the second position.

4. An apparatus as defined in claim 2 wherein the locking device includes a resilient projection movable with the actuator from the first position to the second position and means defining a groove for receiving the projection in said second position to lock the actuator in the second position.

5. An apparatus as defined in claim 1 wherein the locking device includes a resilient projection and means defining a groove for receiving the projection in said second position to lock the actuator in the second position, one of said groove and said projection being movable with the actuator from the first position to the second position.

6. An apparatus for holding a fluid under pressure comprising:
   a container for containing a fluid under pressure;
   said container including a receptacle having an opening therein and a fitting mounted in the opening, said fitting having a passage therethrough leading from the interior to the exterior of the receptacle;
   a valve mounted on the fitting in said passage, said valve having a closed position in which the valve closes the passage and an open position in which the valve opens the passage;
   said valve including an actuator movable between first and second positions for moving the valve between said closed and open positions, respectively;
   a locking section; and
   a locking member lockingly engageable with the locking section of the fitting in the second position of the actuator to lock the valve in the open position, one of said locking section and said locking member being on said fitting and the other of said locking section and said locking member being movable with the actuator, said locking member being configured so as to allow for continuous fluid communication between the container and the exterior after the actuator has been moved to the second position, even upon an attempt to refill the container.

7. An apparatus as defined in claim 6 wherein the locking section is on the fitting and the locking member is movable with the actuator.

8. An apparatus as defined in claim 7 wherein the locking member is generally cup-shaped and opens outwardly of the container.

9. An apparatus as defined in claim 7 wherein the locking member includes an end wall engageable with the actuator and a plurality of spring fingers coupled to the end wall and lockingly engageable with the locking section of the fitting in the second position of the actuator to lock the valve in the open position.

10. An apparatus as defined in claim 7 wherein the locking section of the fitting includes a shoulder in said passage lockingly engageable by the locking member in the second position of the actuator to lock the valve in the open position.

11. An apparatus as defined in claim 10 wherein the fitting has a groove opening in said passage which defines said shoulder.

12. An apparatus as defined in claim 7 wherein the locking member includes an end wall engageable with the actuator and a plurality of spring fingers coupled to the end wall and the locking section of the fitting includes a shoulder in said passage lockingly engageable by the locking member in the second position of the actuator to lock the valve in the open position.

13. An apparatus as defined in claim 7 including a seal in said passage and means for retaining the seal in said passage, said locking device being held between said seal and said actuator in said closed position of the valve.

14. An apparatus as defined in claim 6 including a gas under pressure in said container.

* * * * *

UNITED STATES PATENT AND TRADEMARK OFFICE
CERTIFICATE OF CORRECTION

PATENT NO. : 5,131,625
DATED      : July 21, 1992
INVENTOR(S) : Thomas G. Hacker et al It is certified that error appears in the above-indentified patent and that said Letters Patent is hereby corrected as shown below:

Sheet 2 of the drawing, consisting of Fig. 4-7 should be deleted and replaced with Fig. 3, as shown on the attached page.

Signed and Sealed this

Eighteenth Day of January, 1994

Attest:

BRUCE LEHMAN

*Attesting Officer*   *Commissioner of Patents and Trademarks*